Jan. 31, 1961 D. E. NELSON 2,969,971
REINFORCED PLASTIC SPRINGS
Filed July 23, 1958
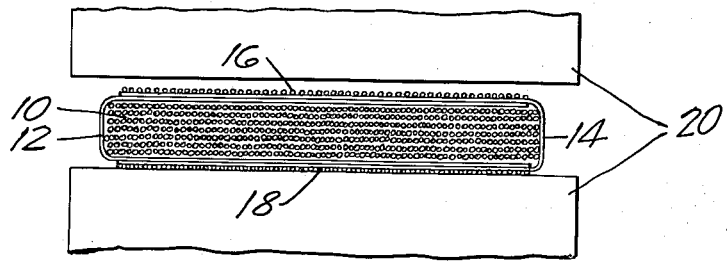
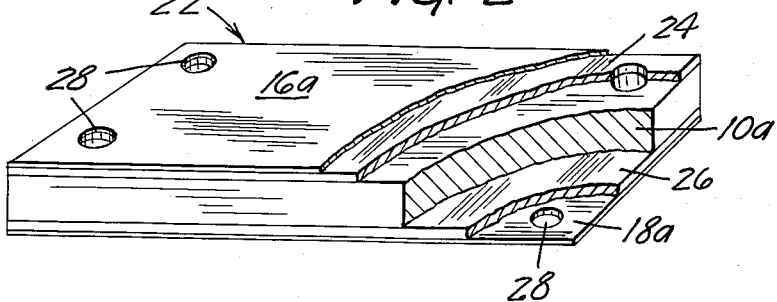
INVENTOR
DONALD E. NELSON
BY
Carpenter, Abbott, Coulter & Kinney
ATTORNEYS

REINFORCED PLASTIC SPRINGS

Donald E. Nelson, Little Canada, Minn., assignor to Minnesota Mining and Manufacturing Company, St. Paul, Minn., a corporation of Delaware Filed July 23, 1958, Ser. No. 750,340

2 Claims. (Cl. 267—1)

This invention relates to reinforced plastic flat springs and to methods of making same.

Flat panels of parallel fine glass filaments embedded in synthetic resin have been shown to have high flexural fatigue strength in the lengthwise direction. They have accordingly been considered to have superior utility as cantilever-mounted springs for use in vibratory conveyors, shaker separators, and the like, and the combination of such springs in a vibrating machine has been claimed in U.S. Patent 2,829,881, issued April 8, 1958, to J. M. Morris. While cantilever-mounted springs in vibratory machines normally encounter large stresses in the longitudinal direction and only minor stresses in the cross direction, springs of the type illustrated in Fig. II of the Morris patent prematurely fail in such use by splitting longitudinally through their thin dimension. Moreover, where flat springs are used as shock or vibration absorbers in rugged applications as in aircraft landing gear and in heavy-duty trucks, substantial cross stresses may be regularly encountered, even though the major stress is still longitudinal.

I have now devised an improved flat spring for use in vibratory machines and in shock-absorbing mountings which spring is characterized by good resistance to cross stresses in addition to excellent longitudinal flexural fatigue strength. Moreover, the novel spring lends itself to substantial economies in manufacture by comparison to the spring of Fig. II of the Morris patent.

Briefly, the novel spring of this invention utilizes as a core a structure such as shown by Morris in Fig. II (i.e., a core of non-woven, lineally-aligned, untwisted or lightly twisted, continuous fine glass filaments which are contiguous and exclusively bonded to each other by hard resinous material and extend in the lengthwise or working direction of the spring), but also includes a pair of relatively thin crosswraps of the same glass filaments, likewise embedded in hard resinous material. The crosswraps are adherently bonded to the top and bottom surfaces of the core, with their filaments extending in the crosswise direction and orthogonal to the filaments of the core.

Preferably a thin surface layer of non-woven, lineally-aligned, continuous fine glass filaments embedded in hard resin is adherently bonded in turn to each of the crosswraps, with the filaments of each such surface layer extending in the lengthwise direction of the spring. The surface layers, crosswraps and core together form an essentially monolithic spring structure. The surface layers serve at least three important functions. They provide improved abrasion resistance as compared to surface layers of crosswise filaments, since abrasive action is negligible except in the lengthwise direction. Also, they prevent the formation of resin fatigue cracks which tend to open up between unprotected crosswise filaments when the surface of the spring is in tension during flexing. Thirdly, the lengthwise surface filaments provide longitudinal strength where longitudinal stress is at a maximum.

The lengthwise surface layers should not be too thick. It has been found that a thickness of about 0.01 inch is adequate for the foregoing purposes. Much greater thicknesses are usually unsatisfactory, since they may develop longitudinal cracks under crosswise stresses. Also, if a large fraction of the total thickness of the spring is in the crosswrap plus the surface layers, the spring may shear along the plane between the core and one crosswrap when the spring flexes to place one side in tension and the other in compression. In fact, it is a matter of some surprise that this plane is seldom a source of failure, even though the crosswrap and surface layers are relatively thin. If abrasion is a particular problem, it may be desirable to increase with care the thickness of the lengthwise surface layer.

The use herein of the terminology "surface layer" does not imply that further exterior layers may not be beneficial. For example, surface coatings of pigmented resin paint have been demonstrated to improve the already excellent resistance of the novel springs to weathering.

Economy in manufacture of reinforced plastic springs is realized through the use of crosswraps over the core, since these may be used to hold the core filaments in place during fabrication of reinforced plastic panels from which the novel springs are cut. Without the crosswraps, the heated press with which the panels are fabricated would have to be provided with properly positioned edge plates, and it would be inconvenient and expensive to process panels of random size. Interestingly, if the surface layer is sufficiently thin, e.g. 0.01 inch in thickness, the filaments thereof do not tend to flow to the edges of the press and so need not be restrained.

The function of the crosswise filaments of the crosswraps in holding the filaments of the core in place during processing may be better understood by reference to the drawing, of which:

Fig. 1 illustrates schematically by an elevational view the process of laying up sheets of resin-impregnated, lineally-aligned filaments to be cured under heat and pressure to provide a reinforced plastic panel; and Fig. 2 is a schematic view in perspective of a spring cut from the panel produced as shown in Fig. 1.

Referring in detail to Figure 1, a plurality of sheets of non-woven, lineally-aligned, continuous fine glass filaments which are contiguous and bonded together by a fusible, thermosetting resinous compositon are laid up to provide a stack 10, with all filaments extending in the same direction—perpendicular to the plane of the drawing. A sheet 12 of the same material is then laid across the top of the stack 10, around one end and across the bottom while a second sheet 14 of the same material is similarly laid around the opposite end of the stack. The filaments of each sheet 12 and 14 extend orthogonally to the filaments of the stack 10. Laid in turn over the exposed surfaces of the sheet 14 are sheets 16 and 18 of the same material, again with the filaments perpendicular to the plane of the drawing of Figure 1. To this structure, heat and pressure are applied by means of a heated platen press, indicated schematically by reference character 20, to compress the structure to a flat, smooth-surfaced panel, and the heat and pressure are maintained until the resinous compositions hardens to an essentially infusible state.

The cured panel may be sawed to a desired shape to provide a spring 22, as shown in Figure 2, having a core 10a of resin-embedded filaments extending in the lengthwise direction. The core 10a is faced with crosswraps 24 and 26 of crosswise-extending filaments, the sheets 12 and 14 having merged in the curing operation into unitary layers. With surface layers 16a and 18a, the filaments of which also extend in the lengthwise direction, a monolithic spring 22 of prime utility is provided. Holes 28 may be drilled at the ends of the spring to provide convenient fastening means.

Referring back to Figure 1, if only one sheet of reinforced plastic is to be used for crosswise support in place of the two sheets 12 and 14, the single sheet may be wrapped around both ends of the stack 10, with its free ends overlapping an inch or two at the center of one side of the stack. In this event, the filaments of one of the crosswise layers are discontinuous, but this has substantially no effect on the crosswise flexural strength of springs cut from the panel, and the discontinuity cannot be detected by external examination. Apparently the additional reinforcement in the overlapped area compensates for the discontinuity so that the filaments of this crosswrap may be considered to be essentially continuous.

The following example describes the fabrication of reinforced plastic flat springs which have demonstrated exceedingly long life in vibratory machines under adverse conditions of crosswise stress, abrasion, and exposure to severe weathering.

EXAMPLE

Reinforced plastic sheet material was prepared by drawing through a heated bath of epoxy resin and phthalic anhydride a large number of lineally-aligned continuous glass filaments, viz., 195–200 ends or bundles per inch of fibrous glass marketed by Owens-Corning Fiberglas as "ECG 140 1/0 60 end roving, 863 hard chrome finish." Each end or bundle included 204 lightly twisted glass mono-filaments of about 0.00038-inch diameter. The epoxy resin was a condensation product of epichlorhydrin and bisphenol A having an epoxide equivalent of about 0.32 per 100 grams of resin and a softening point of about 40° C. as determined by the Durrans' Mercury Method. By immersion in the bath of resin, which was maintained at about 95° C., the glass filaments became a continuous resin-coated web which was passed between a pair of heated steel rollers, the spacing between which was adjusted to provide the web with a resin content of about 35 percent by weight. The web was then contacted with a low-adhesion liner and wound therewith into roll form.

Twenty-six sheets cut from the web were stacked together with all filaments parallel, and one sheet was placed at the top and bottom of the stack with its filaments crosswise to those in the stack. A further sheet was in turn placed over the crosswise sheets, but with its filaments parallel to those in the stack. The whole was then held for about 45 minutes in a heated platen press at a pressure of 25–100 pounds per square inch and a temperature of 330° F. After removal from the press, the cured panel was placed in an air circulating oven for 16 hours at 225° F. Its average thickness was 0.262 inch.

The panel was sawed into springs 5.5 by 10.5 inches with the core filaments extending in the lengthwise direction. The springs, when tested for flexural strength, showed an average of 106,000 pounds per square inch in the longitudinal direction (with a modulus in flexure of 4,600,000 pounds per square inch) and an average of about 18,000 pounds per square inch in the cross direction. In spite of rather good crosswise flexural strength, some failures due to crosswise stresses were experienced when used in a particular vibratory conveyer. However, this failure should not be construed to show that these springs are not normally of sufficient crosswise strength.

A second set of springs was prepared from identical reinforced plastic sheet material, but with only 24 sheets in the core and two crosswise sheets on either side thereof. Again single surface sheets were employed. These springs had an average lengthwise flexural strength of 103,000 pounds per square inch (with a modulus in flexure of 4,500,000 pounds per square inch) and an average crosswise flexural strength of 25,000 p.s.i. When used to replace the original springs in the vibratory conveyor, these springs were satisfactory in every respect and resisted the crosswise stresses under which the first set of springs failed.

A number of flat springs were prepared from the same material and tested as recorded in Table A. Each such spring has demonstrated utility in vibratory machines.

Table A

| No. of Sheets in— | | | Lengthwise | | Crosswise flexural strength (p.s.i.) |
|---|---|---|---|---|---|
| Core | Each crosswrap | Each surface ply | Flexural strength (p.s.i.) | Modulus ×10⁶ (p.s.i.) | |
| 14 | 2 | 1 | 106,000 | 4.5 | 82,000 |
| 18 | 1 | 1 | 101,000 | 5.1 | 33,000 |
| 80 | 4 | 1 | 78,000 | 4.2 | 28,000 |
| 82 | 3 | 1 | 81,000 | 4.2 | 21,000 |
| 138 | 5 | 1 | 93,000 | 5.1 | 23,000 |

It will be appreciated from this data that the novel springs of this invention may be tailored to fit the requirements of each use. In most vibratory machines, it is unnecessary to provide over 20,000–25,000 pounds per square inch flexural strength in the crosswise direction. This proposed minimum may be attained with the sheet material of this example as follows:

| Thickness of cured panel: | No. of sheets in each crosswrap |
|---|---|
| Less than 3/16 inch | 1 |
| 3/16 to 7/16 inch | 2 |
| 1/2 to 15/16 inch | 3 |
| 1 to 1⅞ inches | 4 |
| 2 inches or more | 5 |

A number of resinous compositions have been used with success in fabricating the novel reinforced plastic springs of this invention. Although epoxy resins are generally preferred because of excellent adhesion to glass, excellent mechanical and age-resistant properties, and freedom from shrinkage and evolution of volatiles upon curing, phenolic, polyester, melamine or other resins may be preferred for certain specific applications. It should be noted that mold release agents should be employed in curing these and other thermosetting resins. Thermoplastic resins, on the other hand, can often be used without mold release agents, but are difficult to employ in the preparation of the reinforced sheet material from which the novel springs are cut.

While planar springs are normally preferred for vibratory machines, the novel flat springs may be curved in the lengthwise direction for certain purposes, particularly for shock absorbing uses. Similar changes within the scope of this invention will suggest themselves to those skilled in the art in light of the foregoing teachings.

I claim:

1. A flat reinforced plastic spring for mounting in a machine as an elastically stress-resisting member, said spring comprising (a) a core of non-woven, lineally-aligned, continuous fine glass filaments which are contiguous and are surrounded and exclusively bonded to each other by hard resinous material and extend in the lengthwise direction of the spring, said core constituting a major proportion of the spring and having a pair of parallel lateral surfaces, and adherently bonded to each of said surfaces of the core, (b) a crosswrap of non-woven, lineally-aligned, continuous fine glass filaments which are contiguous and are surrounded and exclusively bonded to each other by hard resinous material and extend in the crosswise direction of the spring.

2. A flat reinforced plastic spring for mounting in a machine as an elastically stress-resisting member, said spring comprising (a) a core of non-woven, lineally-aligned, continuous fine glass filaments which are contiguous and are surrounded and exclusively bonded to each other by hard resinous material and extend in the lengthwise direction of the spring, said core constituting a major proportion of the spring and having a pair of parallel lateral surfaces, and adherently bonded to each of said surfaces of the core, (b) a crosswrap of non-woven, lineally-aligned, continuous fine glass filaments which are contiguous and are surrounded and exclusively bonded to each other by hard resinous material and extend in the crosswise direction of the spring, said crosswraps each having an outer surface parallel to said lateral surfaces, and adherently bonded to each said outer surface, (c) a layer of non-woven, lineally-aligned continuous fine glass filaments which are contiguous and are surrounded and exclusively bonded to each other by hard resinous material and extend in the lengthwise direction of the spring.

References Cited in the file of this patent
UNITED STATES PATENTS

| | | |
|---|---|---|
| 1,967,142 | Bierer et al. | July 17, 1934 |
| 2,327,104 | Gudebrod | Aug. 17, 1943 |
| 2,829,881 | Morris | Apr. 8, 1958 |